April 7, 1942.　　　J. G. CANDIDO　　　2,278,972
APPARATUS FOR LIQUID FUEL BURNING STOVES
Filed Sept. 8, 1939　　2 Sheets-Sheet 1
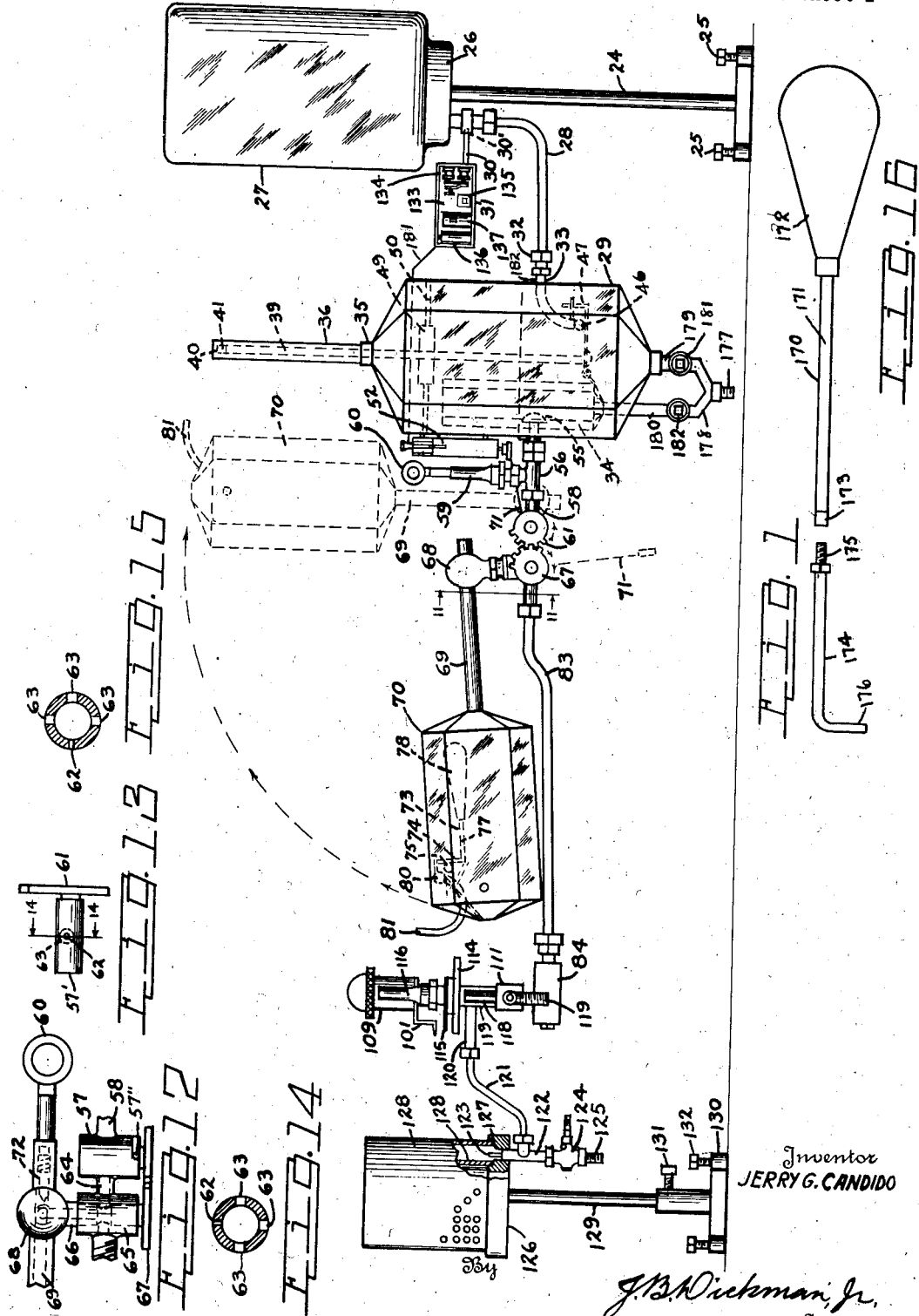
Inventor
JERRY G. CANDIDO
By
J. B. Dickman, Jr.
Attorney

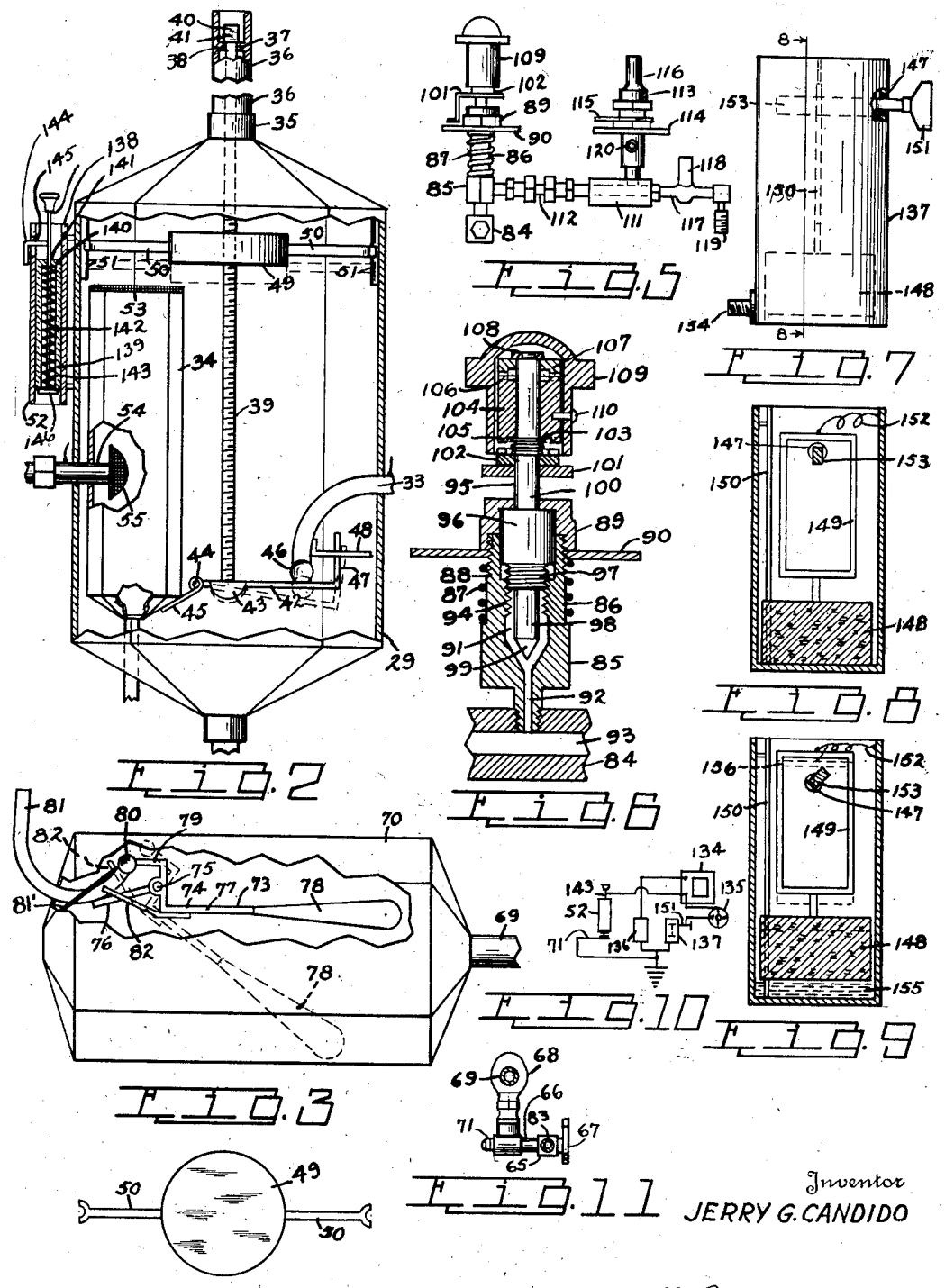

Patented Apr. 7, 1942

2,278,972

UNITED STATES PATENT OFFICE 2,278,972

APPARATUS FOR LIQUID FUEL BURNING STOVES

Jerry G. Candido, New Haven, Conn.

Application September 8, 1939, Serial No. 294,024

2 Claims. (Cl. 158—46.5)

The present invention relates to apparatus for liquid fuel burning stoves.

It is an object of the present invention to provide apparatus for fuel burning stoves that will eliminate the tampering with the apparatus by small children and thus eliminate the possibility of fire from explosion.

Another object of the present invention is the provision of means that eliminates the necessity of regulating dampers and regulating valve after the fuel has been ignited.

A further object of the present invention is the elimination of obnoxious odors from the burning fuel.

A further object of the present invention is the provision of means for preventing children from tampering with the apparatus, thus eliminating injury to them.

A further object of the present invention is the provision of means for purifying the fuel, before reaching the burner.

A further object of the present invention is the provision of means for regulating the flow of fuel from the supply tank to the purifying tank.

A still further object of the present invention is the provision of signaling means for warning the stove attendant that the liquid fuel is getting low in the supply reservoir.

A still further object of the present invention is the provision of means co-acting with the signaling means for setting off the signaling means when a predetermined low level of the fuel in the supply reservoir has been reached.

A still further object of the present invention is the provision of liquid fuel reserve supply means.

A still further object of the present invention is the provision of means carried by the fuel reserve means and co-acting with the signaling means.

A still further object of the present invention is the provision of means for regulating fuel entering the reserve tank.

A still further object of the present invention is the arrangement of valves in the apparatus and means for opening and closing the valves.

A still further object of the present invention is the provision of novel check valve means.

A still further object of the present invention is the provision of means for preventing over-flow of fuel to burners.

A still further object of the present invention is the provision of means for cleaning the fuel burners and fuel supply pipes.

With these and other objects in view the invention consists in the features of construction, combination and arrangement of parts as will be hereinafter more fully described in detail and illustrated in the accompanying drawings and in the claims hereto appended.

In the drawings:

Figure 1 is a front elevational view of my novel apparatus.

Figure 2 is an enlarged view of fuel receiving reservoir and filtering reservoir, parts being shown fragmentarily and in section and illustrating my novel float means for controlling the fuel supply into the filter reservoir, and my novel switch means secured to the receiving reservoir.

Figure 3 is an enlarged view of the reserve reservoir, the front being broken away, disclosing my novel venting means and the mounting of same.

Figure 4 is an enlarged top plan view of my float illustrated in Figure 2.

Figure 5 is a side elevational view taken on line 5—5 of Figure 1 and illustrating the arrangement of a control valve and a regulating valve.

Figure 6 is an enlarged detail, sectional view of the control valve for the supply source shown in Figure 5.

Figure 7 is an elevational view of my novel reservoir used in my signaling circuit and showing in dotted lines the arrangement of the parts therein.

Figure 8 is a sectional view taken on line 8—8 of Figure 7 and illustrating a float carrying a loop and means for guiding the float.

Figure 9 is a sectional view similar to Figure 8 and illustrating the setting of the contact key and the position of the float and loop.

Figure 10 is a wiring diagram for my novel signaling means.

Figure 11 is a view taken on line 11—11 of Figure 1 and illustrating the mounting of one of the gears.

Figure 12 is an enlarged plan view, parts being shown fragmentarily of the arrangement of the gears that control the fuel from the reserve reservoir.

Figure 13 is a side elevational view of one of the gears illustrated in Figure 1 with a valve key and illustrating in solid line one opening in the key and in dotted line a diametrically opening.

Figure 14 is a sectional view taken on line 14—14 or Figure 13 and illustrating the position of openings in the valve key in Figure 13, when one of the gears are in the position shown in Figure 1.

Figure 15 is another sectional view of the key and illustrates the position of the openings in one of the keys when the keys are moved by movement of the reserve reservoir, as shown by dotted lines in Figure 1, the arrows indicating direction of movement of the gears.

Figure 16 is a view of my novel blower and its tip attachment.

Referring to the drawings the numeral 24 represents a suitable standard provided at the base with bolts 25 for leveling the standard, the upper end of the standard having a bowl 26 adapted to receive the inverted neck of an oil supply receptacle. Connected into the bottom wall of the bowl 26 is a pipe 28 having the usual fitting, that connects the pipe with a reservoir 29. Connected into the pipe fitting 28 is a pipe 30 of small diameter, and as indicated by dotted lines 30' is provided with reticulated material, the pipe 30 connecting the bowl 26 with my novel signaling apparatus 31 to be later described. The pipe 28 is provided with a universal joint 32 that connects with pipe 33 shown in dotted lines in the reservoir 29 in Figure 1 and in full lines in Figure 2. Within the reservoir 29 is a filter 34 for a purpose to be later described. The top of the reservoir 29 has a cap 35 to which is secured a guide stem 36, the guide stem being provided with a transverse wall 37 having an aperture 38 therein. Within the guide stem 36 and the reservoir 29 is a threaded rod 39, one end 40 having a squared head 41 adapted for engagement with a key, the squared head 41 being larger than the aperture 38, the threaded rod being of smaller diameter than the aperture 38, thus providing for free vertical movement of the threaded rod 39. The opposite end of the threaded rod 39 is pivotally mounted and housed to an arm 42 at 43, the arm being pivotally mounted at 44 to a bracket 45 that is secured in any suitable manner to the filter 34. The arm 42 has mounted thereon a ball 46 that engages the end of pipe 33 for a purpose to be later described. The end of the arm 47 is disposed at right angles to the arm and engages a slotted guide 48, one end of the guide being secured to the pipe 33.

Within the reservoir 29 is a float 49 having female threads that receive the threads of the rod 39. The float is provided with arms 50, the ends of which are of arcuate configuration and engage guide slides 51 in the reservoir. At one side of the reservoir 29 is secured in any suitable manner a switch 52 that is connected into my signaling circuit and will be more fully described later in the specification.

The filter 34 at the top is provided with reticulated material 53, and in the side of the filter 34 is a pipe 54 to one end of which is secured a semi-circular head 55 of reticulated material. To the other end of the pipe is connected one end of a control valve 56, that connects with a flow valve 57 shown in top plan in Figure 12, by a pipe 58. The control valve 56 is of the well known needle type, the needle stem being housed in the housing 59, the key 60 engaging the head of the needle valve stem. At this point I wish to have it understood that the heads of all the needle valves are of uniform size and therefore the key as illustrated in Figure 22 is adapted for engagement with all. The stem 57' of the flow valve 57 is provided with a stop 57'', the stem having secured to one end a segmental gear 61, the stem being provided with apertures, the aperture 62 being of small diameter and serving as a vent, while apertures 63 are of larger diameter. A pipe 64 connects the valve 57 with a valve 65, the valve stem 66 has mounted on one end a segmental gear 67 that meshes with gear 61. The valve is provided with an annular groove well known in the art, and a channel that communicates with the tube 69, these two features being shown in dotted lines in Figure 12. On the valve stem 66 is a body having a bore through which passes a tube 69, and to the tube 69 is secured a reserve reservoir 70. The opposite end of the valve stem 66 has secured thereto a contact arm 71 to be described later. The body 68 is provided with a bore that communicates with the tube 69 and the channel in the valve stem 66, the tube on the end being provided with a needle valve 72, shown in dotted lines in Figure 12. Within the reserve reservoir 70 is mounted a float vent valve 73 illustrated in dotted lines in Figure 1, and in detail in Figure 3.

The float vent valve 73 comprises a Z-shaped member 74 that is pivotally mounted at 75 to a bracket 76 in any suitable manner to the reserve reservoir 70. One arm 77 of the Z-shaped member has a float 78 secured thereto, the other arm 79 of the Z-shaped member has mounted on the end thereof a ball 80 adapted for opening and closing a pipe 81, the pipe being supported by a bracket 81'. To the arm 77 of the Z-shaped member is secured a forked guide member 82 that engages the outer walls of the pipe 81 as shown in full and dotted lines in Figure 3. The modus operandi of this mechanism will be later described. The valve 65 is connected to a pipe 83 that connects to a member 84. Connected to the member 84 is a valve 85 shown in sectional detail in Figure 6, the body of the valve has a reduced diameter 86 that is encircled by a spring 87, the upper portion 88 being threaded for engagement with a nut 89 and an indicating plate 90, the nut having an aperture therein. The body of the valve 85 is provided with a bore 91 and a channel 92 that communicates with a channel 93 in the member 84, the bore being further provided with a threaded portion 94. Within the bore 91 is mounted a valve stem 95 having an enlarged portion 96, a threaded portion 97 that engages the threads in the bore 91 and a shank 98, the bottom 99 of which is of conical configuration and adapted for engagement with the conical portion of the bore 91. The upper portion of the valve stem has a shank 100 upon which is mounted an indicator finger 101, a toothed member 102, a spring member 103 and a member 104 having teeth 105 and 106, a toothed member 107, and it is to be noted that the end of the shank is reduced and threaded and receives a nut 108. The toothed members 104 and 107 are housed in a housing 109 that is pinioned by a pin 110 to the member 104. The valve 85 is connected to a member 111 by a universal 112. Mounted in the top wall of the member 111 is a needle valve 113 having an indicating plate 114, a finger 115 and a valve stem housing 116. At the end of member 111 is a pipe 117 having a needle valve housed in housing 118 and a depending threaded member 119. In the wall of valve 113 is a pipe 120 that connects with a pipe 121, the pipe 121 connecting with a fitting 122 in which is located the usual wick 124. To the fitting 122 is connected a key valve 123 having a threaded portion 125. The wick is connected into the base 126 of the usual burner that is provided with annular grooves 127, the grooves supporting the usual perforated concentric cylinders 128. The base 126 is supported by a rod 129 that is adjustable in the base 130 by the nut 131, the base being provided with leveling bolts 132.

My novel signaling apparatus comprises a box 133 in which is housed a buzzer 134, a switch 135, a battery 136 and a container 137. I would have it understood at this point, that in place of the battery 136 the alarm signal may be connected to an electrical house circuit through a transformer. The switch 52 as shown in section in Figure 2, comprises a housing 138, and within the housing is mounted a dielectric cylinder 139 having a head 140 and an aperture 141. In the dielectric cylinder is housed a spring 142 and within the spring a pin 143 having an L-shaped arm 144 that engages a slot 145 for holding the pin out of contact, the bottom of the pin having an enlarged contact head 146. As illustrated in the elevational view in Figure 7, the mechanism housed in the container being illustrated in dotted lines, a portion of the wall 147 of the container being broken away to illustrate how the shaft of a key 151 is insulated from the wall of the container. Within the container is a float 148 that carries a loop 149, a guide rod 150, an offset key 151 and an electrical connection 152, a portion 153 of the key being of oblong configuration, the container further provided with an inlet pipe 154 that connects with pipe 30.

In the sectional view Figure 8, the float 148 and key portion 153 are in inoperative position, while in the sectional view Figure 9, I have illustrated fuel 155 in the bottom of the container, the float 148 and loop 149 in a raised position, the key portion 153 set for contact with the loop 149 when the loop contacts the key 153 as shown by the dotted lines 156, the modus operandi to be explained later.

When the apparatus needs cleaning, I have provided an instrument 170 as shown in Figure 16, that comprises a pipe 171 having a bulb 172 at one end and an internal threaded nipple 173 on the other end. An attachment 174 is provided that has a threaded end 175 and an L-shaped end 176, the use of the device to be described later.

In the use of my apparatus as illustrated in Figure 1, the neck of the oil reservoir 27 is placed in the base 26 and the oil flows into pipe 28, into the receiving reservoir 29, through pipe 33. The float 49 in the receiving reservoir is set to a predetermined level by the key 60 engaging and turning the threaded shaft 39, the arm 42, during the filling operation being in the position shown by the dotted lines in Figures 1 and 2. The oil continues to flow into receiving reservoir 29 and when it reaches the top of the filter reservoir 34, the oil then starts filtering through the reticulated material 53 and continues to flow into the reservoir 34 until the reservoir is filled, the fuel oil will not pass into the remainder of the apparatus due to the valve 56 being closed. When the filter reservoir is filled, the float 49 is forced upward by the fuel oil and draws the arm 42 upward until the ball 46 engages and closes the discharge opening of pipe 33. The pipe 30 being positioned as illustrated in Figure 1, fuel oil is filtered through the reticulated material 30′ through pipe 30 and into the container 137, and due to its position only a predetermined amount of oil enters the container 137.

The apparatus is now filled to the control valve 56, the valve 56 is now opened by the key 60 and the fuel oil flows into pipe 58 passing through the horizontal apertures 63 of the valve stem 57′ as illustrated in Figure 14, through pipe 64.

The valve stem 66 is provided with an annular groove well known in the art and shown in dotted lines in Figure 2, the stem having a channel as shown in dotted lines in Figure 12, that communicates with the tube 69, through a channel in the housing 68. Fuel oil passes through the pipe 83 to the member 84 and to the valve 85. The valve 85 being closed, and the valve 72 open, the oil flows into the reserve tank 70, the float valve being positioned as shown in dotted lines in Figure 2, indicating empty. As the oil flows into the reserve tank 70, the float 49 and arm 42 in the receiving reservoir 29 allows additional oil to flow into the reservoir 29 and the filter 34 to replace the fuel oil entering the reserve reservoir 70. As the oil flows into the reserve reservoir 70, the float 78 therein rises until it assumes the position as shown by the full lines in Figure 3. When it is desired to use the burner, the valve 85 is opened by pressing down on the housing 109 that forces the teeth 105 of the member 104 to engage the teeth of member 102, the spring 103 being compressed. The valve stem 95 is then turned until the conical head 99 of the stem is out of engagement with the conical wall of valve 85, the full open position being indicated by the pointer 101 being on the full open mark on the plate 90. The fuel oil then flows from the channel 93 into channel 92 of the valve 85 through pipe 112, into a channel shown by dotted lines in the member 111. The needle valve in the housing 116 is then opened to allow the desired flow of fuel oil, the oil passing into pipe 120 through pipe 121 and into the fixture 122 and into the concentric grooves in the fuel burner base 126. The fuel oil being controlled by valves, only the required amount of oil will enter the concentric grooves in the base, and consequently no flooding will occur. When the burner is lighted, a steady blue flame is obtained, this being due to filtering the fuel oil, mixing same with air and controlling the amount to the burner. When the fuel gets low in the supply container 27, the mechanism contained in the housing 131 will operate. As the fuel oil 155 passes out of the container 137 the float 148 falls with the oil, the loop being carried by the float moves with the float and as the oil level reduces to a point where the top of the loop as shown by dotted lines in Figure 9, contacts the key portion 153, this contact setting off the buzzer 134 through the electrical connection 152. At this point it is to be noted that the switch 52 as illustrated in Figure 2 can also be connected to the buzzer 134 by the pin 143 by manual operation, the arm 144 is released from the slot 145, the expansion spring 142 forcing the pin down until the enlarged head 146 of the pin contacts the arm 71 carried by the valve stem 66, the arm 144 engaging the front wall of the housing 138 at a point uniplanar with the head 140. The buzzer is shut off by the switch 135 or by the raising to a vertical position the reserve reservoir 70, this movement bringing the arm 71 out of contact with the head pin 146. As shown in Figure 1, of the drawings, the contact head of the pin 146 of the switch 52 is connected to the housing 133 by connection 181, pipes 33 and 56 being connected by a connection 182, this being into the ground circuit. In Figure 10 of the drawings I have illustrated a diagrammatic wiring diagram of my signaling system. When the reserve tank is to be used, the needle valve 72 is opened by the key 60, the reserve tank is then raised, and during the raising of the tank, the float 78 drops just enough to allow the reserve reservoir to be vented through pipe 81. As the reserve reservoir is raised the segmental gears 67 and 61 move in the direction shown by the arrows in Figure 1. The gears rotating, rotate the shafts 66 and 57', shaft 57' assuming the position as illustrated in Figure 15, the small opening 62 being in a horizontal position, the oil passing from the reserve reservoir 70 through tube 69, through the channel in the housing 68, through the channel in the valve stem 66 and into the pipe 83. The valve 56 is turned off until a fuel container 27 replaces the empty one, at which time, after fuel oil has filled the reservoir 29 and filter 34, the valve 56 is opened and the reserve reservoir 34 placed in a horizontal position to be again filled.

If it becomes necessary to drain or clean the container, filter and pipes, I have provided for the receiving reservoir 29 and the filter 34 a Y-member 178 having a threaded shank 177, the Y-member having legs 179 and 180, and in the legs I have provided valves 181 and 182 each having a valve stem for engagement with the key 60. If desired the shank 177 may be connected to the nipple 173 of the blower 170. The nipple 173 is also adapted to engage the threaded shank 119 and the valve shank 125. To clean the concentric grooves in the burner base 126, the attachment 174 is fixed to the blower 179 by the threaded portion 175 engaging the nipple 173, the nose portion 176 engaging the usual apertures in the usual concentric grooves in the burner base.

Having fully described my invention, I would have it understood that certain changes in detail and construction may be made without departing from the scope of the invention or to the claims hereto appended.

What I claim is:

1. In a liquid fuel burner apparatus in combination, a burner, a tank comprising a body having one side connected to a key-way valve, the opposite side connected to a conduit, valve stems in said body, each of the valve stems having segmental gears on one end and adapted for rotating the valve stems in a clock- and anti-clockwise direction, one of said valve stems having a plurality of openings, one of said openings being of a reduced diameter, the other of said valve stems having a groove and a channel communicating with said groove, a housing on the opposite end of said valve stem having a channel in communication with the channel in the valve stem, a tube carried by the housing and in communication with the channel in the housing, a valve in one end of the tube and a reserve reservoir on the opposite end, said reserve reservoir having a vent and a float pivotally mounted therein, said float provided with means for engagement with said vent, said float being disengaged from said vent when said reserve reservoir is moved to a vertical position, the valve stems realigning some of the openings in said stems permitting liquid fuel to flow to said burner.

2. In a liquid fuel burner apparatus, a burner, a main fuel tank, a fuel conduit for supplying the burner with fuel from the main tank, valve means in the fuel conduit including a housing, a shaft rotatable in the housing and provided with an annular channel communicating with the fuel conduit, a valve body rotatable in the housing and provided with parts controlling the flow of fuel from the main tank to said annular channel, means transmitting motion between the shaft and valve body, a reserve fuel tank fixed on the shaft for swinging movement between substantially horizontal and vertical positions, means including a duct in said shaft for carrying fuel between said reserve fuel tank and said annular channel, said reserve fuel tank being provided with a vent, a valve controlling the flow of fluid through the vent, and float means operatively connected to the valve so as to close the valve upon filling of the reserve tank in a horizontal position and so as to open the valve upon swinging of the reserve tank to a substantially vertical position.

JERRY G. CANDIDO.